United States Patent Office 3,723,368
Patented Mar. 27, 1973

3,723,368
FAST BAKING CORE COMPOSITION AND
PROCESS FOR PREPARATION THEREOF
Lloyd H. Brown, Crystal Lake, Daniel S. P. Eftax, Barrington, George S. Everett, Clarendon Hills, and James R. Oldham, Wheeling, Ill., assignors to The Quaker Oats Company, Chicago, Ill.
No Drawing. Filed Oct. 5, 1970, Ser. No. 78,245
Int. Cl. C08g 51/18
U.S. Cl. 260—17.2
4 Claims

ABSTRACT OF THE DISCLOSURE

This invention relates to fast baking core compositions which have long bench life, high tensile strength on cure, good resistance to humidity on cure and high green strength, yet the core composition is blowable. The fast baking core compositions of this invention comprise a thermosetting resin selected from the group of furan, phenolic resole, and furan-phenolic resins; a gelling agent; water; hydrophobic resin; and sand; said hydrophobic resin being a member selected from the group consisting of solid powdered phenolic novolacs and solid rosins.

BACKGROUND OF THE INVENTION

Field of the invention.—This invention relates to novel fast baking foundry core compositions which comprise a thermosetting resin selected from the group of furan, phenolic resole, and furan-phenolic resins; a gelling agent; water; hydrophobic resin; and sand. The hydrophobic resin is a member selected from the group consisting of solid phenolic novolac and rosins.

Description of the prior art.—In the foundry art, cores for use in making metal castings are normally prepared from mixtures of a refractory aggregate which has been combined with a binding amount of a curable binder.

Typically, sand is used as the aggregate material. After the sand and binder have been mixed, the resulting foundry core composition is rammed, blown, or otherwise introduced into a core box. Then, by the use of catalyst and/or the use of heat, the binder is caused to cure, thereby converting the formed foundry core composition into a hard, solid, cured state.

Binders which are capable of curing at room temperature have been prepared. A variety of materials have been used as "no bake" binders, but the prior art binders have suffered from one or more deficiencies. Typical of the deficiencies exhibited by prior art resin binders have been a lack of ability to impart green strength, a lack of tensile strength on cure, intolerably short bench life of the foundry core composition, and high sensitivity to moisture of the cured foundry core. Foundry core compositions made with "no bake" resin binders take from one to about twenty-four hours to cure which means that in large volume production, many core boxes will be tied up and much space occupied.

Core binders have been made from various core oils and cereal. While cores formed with core oils and cereal usually have sufficient green strength so that the uncured core can be removed from the core box and will retain its shape without external support, the curing time is typically longer than an hour at temperatures have 350° F. and preferably above 400° F. The long curing time means that a lot of oven space will be occupied. Another shortcoming of the core oil-cereal binders is that there is a critical time-temperature relation in the baking of cores made with core oil-cereal binders. If a core is baked beyond this critical time, the cured core will decrease in tensile strength. The higher the temperature used, the more critical is the point at which cores must be withdrawn from the oven and the greater the attention that must be paid to the core baking cycle.

"Hot box" binders provide foundry core compositions which can be blown into a core box but do not provide uncured cores which retain their shapes without external support. "Hot box" binders are mixed with aggregate and blown into a heated core box. The "hot box" core composition is cured by being subjected to elevated temperatures from 225° F. to about 500° F. Although the high heat of the core box imparts a rapid cure and, therefore, the dwell time of the core in the core box is short, the process is expensive since the core boxes must be made of material which can be heated. Most typically the core boxes used with "hot box" resins are made of metal.

A third type of core binder is the urea-formaldehyde-cereal binder. This system requires sufficient water to be present in order that the foundry core will have sufficient "green or wet strength" to retain its shape until it is placed in an oven. The presence of water in the required quantities increases the curing time. In addition this binder produces a core that collapses too readily on contact with high-temperature melting metals, such as grey iron. Another problem with the core produced by this binder is the lack of humidity resistance. Lack of such resistance causes the core to lose strength upon exposure to an atmosphere with high humidity.

In view of the above, there currently exists a need for a foundry core binder which imparts the following combination of properties to the cured or uncured core:

(1) fast curing of the core composition at moderate temperatures,
(2) a tolerable bench life of the core composition,
(3) high tensile strength on cure,
(4) moisture resistance of the cured core,
(5) sufficient green strength in the uncured core that it retains its desired shape without external support and can be removed from the core box,
(6) blowability of the core composition,
(7) little time-temperature curing effect on the tensile strength of the cured core by overbaking, and
(8) useful in molding high-temperature melting metals such as grey iron.

Nowhere has a foundry core composition having this combination of desirable properties been developed or suggested.

SUMMARY OF THE INVENTION

It is an object of this invention to provide a foundry core composition which is fast curing at 325° F.

It is another object of this invention to provide a core composition which has a bench life of two or more hours at 100° F.

It is still another object of this invention to provide a foundry core composition which has high tensile strength on cure.

It is a further object of this invention to provide a foundry core composition which is moisture resistant when cured.

It is still a further object of this invention to provide a foundry core composition which imparts sufficient green strength to the uncured core that it retains its shape without external support and can be moved from the core box.

It is yet a further object of this invention to provide a foundry core composition which can be blown into the core box.

It is even yet an object of this invention to provide a foundry core composition which when cured is generally useful in casting metals and is useful with high-melting metals such as grey iron.

It is still yet a further object of this invention to provide a foundry core composition whose tensile strength on cure is little effected by over baking.

No conventional core composition possesses the desirable properties of the core composition of this invention. The core compositions of this invention have the following properties among others: fast baking at moderate oven temperatures, long bench life, high tensile strength on cure, good resistance to humidity on cure, and high green strength. Furthermore, our fast baking core compositions are below moldable. We do not mean to imply that these are the only advantages of our invention.

The objects of this invention are accomplished by a fast baking core composition which comprises sand; a thermosetting resin member selected from the group consisting of furan resins, phenolic resins, and furan-phenolic resins; an operable amount of 2 percent by weight based on the weight of the sand of a gelling member selected from the group consisting of cereal, clay, and mixtures thereof; water; and from 0.1 to 1.0 percent by weight based on the weight of the sand of a solid hydrophobic member selected from the group consisting of phenolic novolac and rosin.

The fast baking core compositions of this invention are prepared by a method which comprises blending together sand; a thermosetting resin member selected from the group consisting of furan resins, phenolic resins, and furan-phenolic resins; an operable amount to 2 percent by weight based on the weight of the sand of a gelling member selected from the group consisting of clay, cereal, and mixtures thereof; water; and from 0.1 to 1.0 percent by weight based on the weight of the sand of a solid hydrophobic member selected from the group consisting of phenolic novolac and rosin.

It is to be understood that by thermosetting furan resins we mean furfuryl alcohol-formaldehyde resins including furfuryl alcohol resins wherein urea-formaldehyde has been substituted for part of the furfuryll alcohol and furfuryl alcohol resins wherein furfural has been substituted for part of the furfuryl alcohol. Furfuryl alcohol-formaldehyde resins such as those produced in accordance with a procedure comparable to those disclosed in U.S. Pat. No. 2,874,148 and in U.S. Pat. No. 2,343,973; furfuryl alcohol-urea-formaldehyde such as those set forth in U.S. Pat. No. 1,665,235, U.S. Pat. No. 2,431,035, U.S. Pat. No. 2,343,973, and U.S. Pat. No. 2,601,497; and furfuryl alcohol-furfural resins such as that set forth in U.S. Pat. No. 2,471,600 are satisfactory in the core compositions of this invention.

It is further to be understood that by thermosetting phenolic resins we means phenolic resoles including phenol-urea-formaldehyde resins. The above phenolic resins include such phenols as resorcinol, cresol, and xylenol, for example. Likewise a variety of aldehydes may be used in the phenolic resins such as formaldehyde, benzaldehyde, furfural, and acetaldehyde. Phenolic resoles such as those generally described in J. D. Roberts and M. C. Caserio, Basic Principles of Organic Chemistry, W. A. Benjamin, Inc., 1965, p. 1103, are suitable thermosetting resins in the core compositions of this invention. Phenol-urea-formaldehyde resins such as that set forth in U.S. Pat. No. 3,306,864 are also suitable phenolic resins.

It is still further to be understood that by furan-phenolic resins we mean phenolic modified furfuryl alcohol resins including phenol - urea - formaldehyde - furfuryl alcohol resins. A suitable phenol-urea-formaldehyde-furfuryl alcohol resin is described for example in U.S. Pat. No. 3,312,650.

We have found furan resins comprising furfuryl alcohol-urea-formaldehyde-calcium lignosulfonate resin to be particularly useful in the core compositions of this invention. One preferred embodiment of this invention is a fast baking core composition which comprises sand; an operable amount to 2 percent by weight based on the weight of the sand of a gelling member selected from the group consisting of cereal and clay; water; from 0.1 to 1.0 percent by weight based on the weight of the sand of a solid hydrophobic member selected from the group consisting of phenolic novolac and rosin; a furfuryl alcohol-urea-formaldehyde-calcium lignosulfonate binder, said binder comprising 25 to 50 parts by weight of a combination of furfuryl alcohol and calcium lignosulfonate, wherein said combination comprises no more than 25 percent by weight of said calcium lignosulfonate; about 70 to 35 parts by weight of a stable non-polymerized aqueous mixture of urea, formaldehyde, and equilibrium products thereof; said urea being present in an amount sufficient to give a molar ratio of available urea to available formaldehyde in the range of about 1.5:1 to 5:1 in said core composition.

The fast baking core compositions of the preferred embodiment of this invention are prepared by a method which comprises blending together sand; an operable amount to 2 percent by weight based on the weight of the sand of a gelling member selected from the group consisting of cereal and clay; water; from 0.1 to 1.0 percent by weight based on the weight of the sand of a hydrophobic member selected from the group consisting of phenolic novolac and rosin; and a furfuryl-alcohol-urea-formaldehyde-calcium lignosulfonate binder. The above mentioned binder comprises 25 to 50 parts by weight of a combination of furfuryl alcohol and calcium lignosulfonate, wherein said combination comprises no more than 25 percent by weight of said calcium lignosulfonate; about 70 to 35 parts by weight of a stable non-polymerized aqueous mixture of urea, formaldehyde, and equilibrium products thereof; and said urea is present in an amount sufficient to give a molar ratio of available formaldehyde in the range of about 1.5:1 to 5:1 in said core composition.

The sodium, magnesium, aluminum, and ammonium lignosulfonate may also be used in the preferred embodiment of this invention.

Cores and molds according to this invention are prepared by using any of the well-known core forming materials, such as quartz or silica sand, zirconium oxide, sea sand, bank sand, lake sand, reclaimed molding sand, olivine, chromite and similar core and mold forming materials.

In the fast baking core compositions of this invention, it is essential to use from an operable amount to 2.0 percent by weight based on the weight of the sand of a gelling agent which is cereal or clay to provide a core composition with a satisfactory green strength. Examples of useful clays are fireclays, china clay, Southern bentonite, Western bentonite, and Fuller's earth. Examples of cereals include gelatinized starches, made from wet mulling of corn starch; dextrins, made from corn starch; and gelatinized corn flour made from dry milling hominy grits or meal.

When the gelling agent is added, the amount of clay and other gelling agents naturally present in the sand must be taken into consideration. This can easily be accomplished by one skilled in the art. It is preferred that the gelling agent be less than 1 percent by weight based on the weight of the sand when it has a high surface area like bentonite. If more than 1 percent by weight of bentonite is used in the fast baking core compositions of this invention then the permeability of the core is adversely affected. If the gelling agent does not have a high surface area like bentonite, for example pregelatinized corn flour then up to 2.0 percent by weight based on the weight of the sand is used in the fast baking core compositions of this invention without adversely affecting the permeability of the core. However, as it is well known in the art, the use of up to 2.0 percent by weight pregelatinized corn flour in the binder will produce a core which when used in some foundry applications will envolve more gas than can be tolerated. An operable amount of gelling agent is defined as the amount necessary to give a satisfactory green strength for the particular foundry application involved but not less than 0.5 percent by weight based on the weight of the sand. The preferred amount of gelling agent is the amount necessary to provide a core composition which has a green strength of at least 0.50 p.s.i.

In one preferred embodiment of this invention, we have found that a core composition comprising between 0.25 and 0.5 percent by weight bentonite based on the weight of the sand and between 0.75 and 0.5 percent by weight pregelatinized corn flour gives excellent cores.

It is essential when the thermosetting resin binder is a furfuryl alcohol-urea-formaldehyde-calcium lignosulfonate binder that the binder comprise 25 to 50 parts by weight of a combination of furfuryl alcohol and calcium lignosulfonate, wherein said combination comprises no more than 25 percent by weight of calcium lignosulfonate, and about 70 to 35 parts by weight of a stable non-polymerized aqueous mixture of urea, formaldehyde, and equilibrium products thereof; the urea being present in an amount sufficient to give a molar ratio of available urea to available formaldehyde in the range of about 1.5:1 to 5:1 in said core composition. That it is essential that there be no more than 25 percent by weight calcium lignosulfonate in the above mentioned combination is clearly demonstrated in Example 8 of the preferred embodiments.

It is to be understood that by aqueous urea-formaldehyde mixtures we mean for example "U.F. Concentrate-85" sold by the Nitrogen Division of Allied Chemical and Dye Corporation, South Point, Ohio. Another aqueous urea-formaldehyde mixture is made by E. I. du Pont de Nemours and Company, Wilmington, Del., and is marketed as "Urea-Formaldehyde 25–60." Other examples of aqueous urea-formaldehyde mixtures are "Sta-Form 60" by Georgia-Pacific Company, Portland, Oreg., "UF-85" and "UF-78" by Borden Chemical Division, Borden, Inc., New York, N.Y., "Agrimine" by Reichhold Chemical, Inc., White Plains, N.Y., "Formourea 60" by Montecatini Edison of Italy, and "Formol 55" by Badische Anilin- and Soda-Fabrik AG. of Germany. The formaldehyde, urea, and equilibria reaction products thereof, present in aqueous urea-formaldehyde mixtures are believed to exist in equilibria as follows:

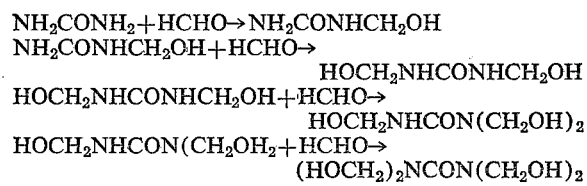

The above equilibria illustrate what is meant by the phrase "aqueous urea-formaldehyde mixture." Those urea molecules in the equilibria shown above that have more than one methylol radical attached are sometimes referred to as polymethylol ureas. There is difficulty encountered in distinguishing between the different polymethylol ureas in the aqueous urea-formaldehyde mixtures. For this reason the composition of the aqueous urea-formaldehyde solution is reported in a weight percent of urea and formaldehyde. A typical analysis of Allied Chemical's aqueous urea-formaldehyde mixture ("U.F. Concentrate-85") shows 59 percent by weight formaldehyde, 26 percent by weight urea, and about 15 percent by weight water.

The furfuryl alcohol-urea-formaldehyde-calcium lignosulfonate binder is prepared by a process in which furfuryl alcohol and a non-polymerized aqueous mixture of formaldehyde, urea, and equilibrium reaction products thereof are admixed to form a solution having the above described proportions. When a typical aqueous urea-formaldehyde mixture like "U.F. Concentrate" made by Allied Chemical is used, it is necessary to add additional urea to provide a molar ratio of available urea to available formaldehyde in the range of about 1.5:1 to 5:1 in said core composition. It should be recognized that the additional urea may be either added to the furfuryl alcohol-urea-formaldehyde-calcium lignosulfonate binder before it is mixed with the remaining core composition components or the additional urea may be added with the binder to the other core composition components.

The viscosity of the above furfuryl alcohol-urea-formaldehyde-calcium lignosulfonate binder when freshly prepared at 25° C. is about 120 centipoises. The binder may be heat bodied to increase the viscosity. As demonstrated in Example 1 of the preferred embodiments, the degree of heat bodying is a function of both pH and of temperature. The upper limit on the viscosity of the binder used in the fast baking core compositions of this invention is set by handling convenience at about 5000 centipoises. This upper limit on the viscosity is determined by such arbitrary factors as (a) handling equipment for the resin and capacities thereof, (b) mulling and distributing efficiency of machines for preparing the core composition, and (c) other factors allied with the use of the core composition in the foundry.

It is sometimes desirable to heat body the thermosetting binder since the green compressive strength of the uncured core composition is a function of the viscosity of the binder. While core compositions with sufficient green compressive strength can be made with freshly prepared binder, it is preferred that the binder be heat bodied until the viscosity of the binder is about 500 centipoises.

In one preferred embodiment a binder comprising 28.5 parts by weight furfuryl alcohol, 52.5 parts by weight urea-formaldehyde and 19 parts by weight calcium lignosulfonate was lowered in pH to 4 and heated with condensation at 80° F. for 4 hours. The thermosetting resin in the above heat bodying step increased in viscosity from about 150 centipoises to about 2300 centipoises.

It is preferred that from 0.5 to 3.0 percent by weight based on the weight of the sand of the core composition consists of the thermosetting resin binder. If less than 0.5 percent by weight of the above binder is used the core composition will have a lower tensile strength than if 3.0 percent by weight binder is used. While more than 3.0 percent by weight of the above binder may be used, it is uneconomical to do so.

In accordance with this invention, it is essential that the binder in the fast baking core compositions comprise from 0.1 to 1.0 percent by weight based on the weight of the sand of a solid hydrophobic resin, selected from the group consisting of phenolic novolacs and rosins. As demonstrated in the following examples the hydrophobic resin is essential in the core composition to provide a cured core which is resistant to humidity on cure. It is also essential that the hydrophobic resin be a solid, and it is preferred that the resin be powdered to facilitate easy distribution throughout the core composition. The hydrophobic resin also contributes to the green strength of the core composition and to the tensile strength of the cured core.

It is to be understood that by rosin we mean an amorphous, brittle resin obtained mainly from pine stumps by solvent extraction. By phenolic novolacs we mean the condensation products of phenols or phenolic derivatives with aldehydes such as formaldehyde and furfural. Suitable phenols, and phenolic derivatives include phenol, cresol, resorcinol, and methylol phenol, for example.

Also as demonstrated by the examples, it is essential that at least 0.1 percent by weight hydrophobic resin based on the weight of the sand be used in the core compositions. Use of less than 0.1 percent hydrophobic resin does not provide a core with satisfactory humidity resistance on cure.

It is essential that there be water in the core composition to produce satisfactory green strength. The operable amount of water is the amount necessary to give sufficient green strength for the particular foundry operation but not less than 0.5 percent by weight based on the weight of the sand. We have found that the preferred amount of water is 2.0 percent by weight based on the weight of the sand. If more than 2.0 percent by weight water is used, the green strength is also adversely affected. The preferred amount of water in the fast baking core compositions of this invention will depend somewhat on the amount of high surface area gelling agent used. For example more water can be used in the core compositions of this invention when bentonite is chosen as the gelling agent than when pregelatinized corn starch is used. The effect of a high surface area additive on a core composition is well known in the art and can be easily determined by one skilled in the art.

The water may be added to our fast baking core compositions with the catalyst, with the binder, or as free water. In one of the preferred embodiments, it is added with both the catalyst and with the furfuryl alcohol-urea-formaldehyde-calcium lignosulfonate binder. An advantage of adding the water with the catalyst is had when the catalyst is soluble in water. When the catalyst is soluble in water, the addition of the catalyst dissolved in the water facilitates easy distribution of the catalyst throughout the core composition.

It is not essential that there be catalyst to catalyze the curing of the core composition of this invention; however, the use of an acid catalyst is preferred. Most acids can be used, but the ammonium acid salts are preferred. For example, phosphoric acid and p-toluene sulfonic acid are satisfactory catalysts. Ammonium chloride, ammonium trichloroacetate, ammonium dihydrogen phosphate, ammonium sulfate and ammonium nitrate are all satisfactory ammonium acid salt catalysts. Ammonium salts of a strong acid are particularly well adapted to use as a catalyst.

The amount of the catalyst used will vary with the amount of thermosetting resin used, the type of thermosetting resin, the type of sand used, and the curing time desired. For example, sands with a high clay content may have a high acid demand and require more acid catalyst. In general, the more catalyst the more rapid the cure. It is undesirable to have a too rapid cure since the bench life of the core composition will be shortened. We have found that it is preferred to use no more than 4 percent by weight based on the weight of the binder. The amount of catalyst for the particular application desired can be easily determined by one skilled in the art.

The fast baking foundry core compositions of this invention may optionally contain such materials as ferric oxide or a lubricant. In some foundry operations ferric oxide is added to eliminate or reduce blemishes, such as fissures or fins on cored surfaces of castings. The practice consists of adding from ¼ to 2 percent iron oxide to the core mixture.

While lubricants in the core composition of this invention are not essential, it is preferred particularly where a core box is to be used repeatedly. Such release agents as "Zip-Slip" made by Ashland Oil and Refining Company, Ashland, Ky., when activated with kerosine are a satisfactory lubricant. Release agents applied to the core box may be used in placed of a lubricant which is made an integral part of the core composition. For example a suitable release agent is a slippery coat of detergent.

According to one preferred embodiment of this invention the fast baking core compositions of this invention can be prepared by first mulling together the gelling agent and the sand. To the mulled sand and gelling agent is added a water solution of the catalyst. The catalyst is preferably added to this stage to insure complete distribution of the catalyst throughout the core composition. Finally to the mulled gelling agent, sand, water, and catalyst is added to the furfuryl alcohol-urea-formaldehyde-calcium lignosulfonate binder, and hydrophobic resin and optionally ferric oxide and a lubricant. The entire mixture is then mulled together.

While all types of mullers can be used, the cycle will depend upon the type of muller. As is well known in the art, a core composition having a low green strength and a low tensile strength on cure is produced from a core composition which is insufficiently mulled. The choice of a muller and the cycle can easily be made by one skilled in the art.

The bench life of the fast baking core composition refers to the time interval existing between the time the foundry core composition is prepared and the time when the mix can no longer be readily and effectively introduced into a pattern.

The bench life of the fast baking core compositions of this invention is a function of the sand temperature, ambient temperature, nature and level of catalyst, nature of the hydrophobic resin, moisture level in the binder, and the ambient humidity. The bench life of the core compositions of the preferred embodiment comprising furfuryl alcohol-urea-formaldehyde-calcium lignosulfonate at 25° C. is about 4 hours for example. At 37° C. the same core composition would have a bench life between one-half and one hour. $NH_4OH$ may be optionally added to the core composition to increase the bench life.

The fast baking core composition can be rammed, blown, tamped, or introduced into a mold by any conventional method. Immediately upon forming the core, the formed core may be removed from the core box.

The formed core is cured by heating at a temperature above 212° F. The time necessary to cure the core depends upon the presence and the level of the catalyst, and the temperature of the oven. In general the higher the level of the catalyst and the higher the temperature of the oven, the faster the cure. It is undesirable to cure the core too quickly. As it is well known in the art, a core which is cured too quickly will have an unsatisfactory tensile strength and may crack due to internal stresses on the cured "skin." An oven temperature above 500° F. should not be used since that temperature will promote too rapid a cure or will result in the decomposition of the binder in the core composition. The exact time and temperature at which a core should be cured to produce a satisfactory core can be easily determined by one skilled in the art. The core compositions of this invention are not as susceptible to loss of tensile strength from over baking as are core oils.

A method for forming a refractory article bonded with the fast baking core composition comprises (a) blending sand with an operable amount to 2 percent by weight based on the weight of the sand of a gelling member selected from the group consisting of cereal, clay, and mixtures thereof; water; from 0.1 to 1.0 percent by weight based on the weight of the sand of a solid hydrophobic member selected from the group consisting of phenolic novolac and rosin; and a thermosetting resin member selected from the group consisting of furan resins, phenolic resins, and furan-phenolic resins; (b) molding the blended mixture into a desired shape; (c) removing the shaped mixture from the mold; and (d) curing the shaped mixture at a temperature between 212° F. and 500° F.

DESCRIPTION OF THE PREFERRED
EMBODIMENTS

The following preferred embodiments of the invention are shown for the purpose of illustrating this invention and demonstrating the best mode for practicing the invention. It will be apparent to those skilled in the art that various changes and modifications may be made therein without departing from the spirit and scope of the invention as it is more precisely defined in the subjoined claims.

Throughout the preferred embodiments percents are expressed in terms of percent by weight based on the weight of the sand unless otherwise indicated.

It is to be understod that cereal refers to pregelatinized corn flour in the examples.

The green compressive strength of the core composition in the following examples was determined by the tentative standard method for determination of green compressive strength of cores published in the Foundry Sand Handbook, copyright 1963, by the American Foundrymen's Society, Des Plaines, Ill., in Section 13, pages 9 through 10. The test instrument used, in addition to the American Foundrymen's Society (AFS) Standard Specimen Container and Rammer, ibid., Section 4, pages 5 through 11, was a spring type compression loading instrument manufactured by Harry W. Dietert Company, Detroit, Mich.

Throughout the examples the baked tensile strength of the core composition was determined by the American Foundrymen's Society Standard Method for Determination of Baked Tensile Strength of Cores (Briquet Method) (ibid.) Section 13, pages 1 through 5, using a Detroit testing machine Model Number CST-123S manufactured by the Detroit Testing Machine Company, Detroit, Mich.

The water resistance was determined by dipping tensile strength specimens obtained by the method in the previous paragraph into a core wash manufactured by the Thiem Company, Milwaukee, Wis., and marketed under the name "Satin-Kote"; for three (3) seconds; soaking in the atmosphere for thirty (30) minutes; then baking specimens for varying lengths of time in an oven of forced air design at 325° F. and then immediately testing these specimens for tensile strength; specifically baked for three minutes and tested within one minute thereafter, baked six minutes and tested within one minute thereafter, baked nine minutes and tested within one minute thereafter; thus duplicating the most rigorous of water damage conditions in the foundry.

Example 1

285 grams furfuryl alcohol, 525 grams of "U. F. Concentrate-85", and 190 grams of 50 percent by weight calcium lignosulfonate in water were thoroughly mixed.

The viscosity of the freshly prepared binder at 25° C. was 120 centipoises. The binder is hereinafter designated "Binder Q."

1000 grams of freshly prepared Binder Q was added to a 2000 ml. round bottom, 3-neck flask fitted with a heating mantle, condenser, stirrer, and a thermometer. 8.0 grams 50 percent by weight $H_3PO_4$ was added to the Binder Q to adjust the pH to 3.0. The temperature was gradually raised to heat body the Binder Q. The increase in viscosity with time is given in Table I. The viscosity was determined by a Brookfield viscometer, Model LVF.

TABLE I

| Time (hrs.) | Temperature (° C.) | Viscosity at 25° C. (cps.) |
| --- | --- | --- |
| 0 | 25 | 200 |
| 2.5 | 29 | 250 |
| 3.0 | 53 | 340 |
| 4.0 | 95-100 | Gelled |

Another 1000 grams of freshly prepared Binder Q was heat bodied by the above procedure except that 4.0 grams 50 percent by weight $H_3PO_4$ was added to the Binder Q to give a pH of 3.55. The increase in viscosity with time for this test is given in Table II.

TABLE II

| Time (hrs.) | Temperature (° C.) | Viscosity at 25° C. (cps.) |
| --- | --- | --- |
| 0 | 25 | 200 |
| 6 | 105 | 560 |

Still another 1000 grams of freshly prepared Binder Q was heat bodied by the above procedure except that the pH of the Binder Q was adjusted to 4.0 with a 50 percent solution of $H_3PO_4$. The temperature was raised to 80° C. and held at that temperature for 6.5 hours. The increase in viscosity is a linear function of time. The data are given in Table III.

TABLE III

| Time (hrs.) | Temperature (° C.) | Viscosity at 25° C. (cps.) |
| --- | --- | --- |
| 1 | 80 | 600 |
| 2 | 80 | 910 |
| 3 | 80 | 1,300 |
| 4 | 80 | 1,845 |
| 5 | 80 | 2,500 |
| 6 | 80 | 2,760 |
| 6.5 | 80 | 3,000 |

One of the purposes of this example is to show that Binder Q can be increased in viscosity by heat bodying. One other purpose is to show that the rate and degree of heat bodying is a function both of pH and of temperature.

EXAMPLE 2

6000 grams reclaimed core oil sand, 4000 grams lake sand, 50 grams pregelatinized corn flour, 50 grams Southern bentonite, 25 grams ferric oxide, and 25 grams powdered phenolic novolac were thoroughly mixed with a Simpson mixer, Model LF for one minute.

To the above dry mixture was added a solution of 3.5 grams $NH_4Cl$ and 33.4 grams urea in 130 grams water. The mixing was continued for three minutes.

200 grams of freshly prepared Binder Q were then added and the mixing begun again. After two minutes of mixing and without interrupting the mixing 2 grams "Zip-Slip" (trademarked by Ashland Oil and Refining Company, Ashland, Ky.) were added. One minute after the addition of the "Zip-Slip" and again without stopping the mixing, 7.5 grams kerosine were added. Mixing was continued for one minute The green compressive strength, baked tensile strength, and water resistance are reported in Table IV. The tensile strength of the core composition was tested after baking samples for 14 minutes at 325° F. The water resistance of core composition of samples was tested after baking the dipped samples at 325° F. for 3, 6, 9, and 15 minutes.

TABLE IV

| | P.s.i. |
| --- | --- |
| Green compressive strength | 0.66 |
| Baked tensile strength | 193 |
| Water resistance: | |
| 3 min. | 117 |
| 6 min. | 65 |
| 9 min. | 78 |
| 15 min. | 88 |

Following the procedure of Example 2, Tests 1, 2, and 3 were made. The compositions of the three test cores are given in Table V. The green compressive strength, baked tensile strength, and water resistance are reported in Table V. The tensile strength of the core composition was tested after baking samples for 15 minutes at 450° F. The water resistance of the core composition of samples was tested after baking the dipped samples at 325° F. for 3, 6, and 9 minutes.

TABLE V

| | Test core composition | | |
|---|---|---|---|
| | 1 | 2 | 3 |
| Aggregate, grams | [1] 2,000 | [2] 2,000 | [3] 2,000 |
| Cereal, grams | 15 | 15 | 15 |
| Bentonite, grams | 6 | 6 | 6 |
| Ferric oxide, grams | 5 | 5 | 5 |
| Powdered phenolic novolac, grams | 8 | 8 | 8 |
| Catalyst solution, grams | 25 | 25 | 25 |
| Binder Q (120 cps.), grams | 40 | 40 | 40 |
| Green compressive strength (p.s.i.) | 0.55 | 0.55 | 0.80 |
| Baked tensile strength (p.s.i.) | 198 | 384 | 729 |
| Water resistance (p.s.i.): | | | |
| 3 minutes | 114 | 314 | 633 |
| 6 minutes | 61 | 244 | 389 |
| 9 minutes | 93 | 226 | |

[1] Reclaimed core oil sand.
[2] Nedron.
[3] Chromite.

The catalyst solution consisted of 25 grams water, 7.4 grams urea, and 0.8 grams of ammonium nitrate.

This example shows among other things that the core compositions of this invention are made from a variety of refractory aggregates. The examples further show that the green compressive strength, the baked tensile strength, and the water resistance of the core composition depends on the aggregate selected for an otherwise given formulation of core composition.

EXAMPLE 3

Using the procedure of Example 2, Tests 4 and 5 were made. Test 4 was with a Hobart mixer, Model K-45 and Test 5 was with a Clearfield mixer, Ser. No. 598C. The compositions of the two test cores are given in Table VI. The green compressive strength and the baked tensile strength are also given in Table VI. The tensile strength of the core composition was tested after baking samples for 20 minutes at 450° F.

TABLE VI

| | Test core composition | |
|---|---|---|
| | 4 | 5 |
| Reclaimed sand, grams | 1,600 | 1,600 |
| Lake sand, grams | 400 | 400 |
| Cereal, grams | 15 | 15 |
| Bentonite, grams | 5 | 5 |
| Ferric oxide, grams | 5 | 5 |
| Powdered phenolic novolac, grams | 6.5 | 6.5 |
| Catalyst solution, grams | 20 | 20 |
| Water, grams | 10 | 10 |
| Binder Q (24,000 cps.), grams | 40 | 40 |
| "Zip-Slip", grams | 2 | 2 |
| Kerosine, grams | 2 | 2 |
| Green compressive strength (p.s.i.) | 0.65 | 1.1 |
| Baked tensile strength (p.s.i.) | 291 | 273 |

The catalyst solution used in Tests 4 and 5 consisted of 7.4 grams urea and 0.2 grams $NH_4NO_3$ in 12.4 grams water.

This example shows among other things that the green strength is clearly a function of the efficiency of the mixer. In the above tests, the Clearfield mixer is a more efficient mixer than the Hobart mixer.

EXAMPLE 4

Following the procedure of Example 2, Test Core Compositions 6 and 7 were prepared. The test core compositions were prepared in a Simpson muller, Model LF, according to standard formulations for each binder. The compositions of the test core are reported in Table VII. Core oil was substituted for Binder Q in Test Core 7. The green compressive strength, baked tensile strength, and water resistance of the cured core are reported in Table VII.

The tensile strength of Test Core Composition 6 was determined after baking samples for 14 minutes at 325° F. The tensile strength of Test Core Composition 7 was determined after baking samples for 50 minutes at 450° F. The water resistance of cured composition samples was tested after baking the dipped samples at 325° F. for 3, 6, 9 and 15 minutes.

TABLE VII

| | Test core composition | |
|---|---|---|
| | 6 | 7 |
| Reclaimed sand, grams | 6,000 | 6,000 |
| Lake sand, grams | 4,000 | 4,000 |
| Cereal, grams | 50 | 50 |
| Bentonite, grams | 50 | 10 |
| Powered phenolic novolac, grams | 25 | 0 |
| Ferric oxide, grams | 25 | 25 |
| Water, grams | 125 | 165 |
| $NH_4Cl$, grams | 4 | 0 |
| Urea, grams | 37 | 0 |
| Core oil, grams | 0 | 155 |
| Binder Q (2,500 cps.), grams | 200 | 0 |
| Kerosine, grams | 7.5 | 7.5 |
| Green compressive strength (p.s.i.) | 0.66 | 0.59 |
| Baked tensile strength (p.s.i.) | 193 | 180 |
| Water resistance (p.s.i.): | | |
| 3 minutes | 117 | 69 |
| 6 minutes | 65 | 49 |
| 9 minutes | 78 | 112 |
| 15 minutes | 88 | 96 |

Among the purposes of this example is to show that the core compositions of this invention cure much more rapidly and at a lower temperature than core compositions based on core oil and provide cured core compositions having good tensile strength. Another purpose of this example is to demonstrate that the cured core compositions of this invention have superior water resistance to cured core oil compositions.

Example 5

Following the procedure of Example 2, Test 8 was made. Test 8 was made with a Hobart mixer. The composition of Test Core Composition 8 is given in Table VIII. The green compressive strength, baked tensile strength and water resistance of the tests are given in Table VIII. The tensile strength of the core composition was tested after baking samples for 20 minutes at 325° F. The water resistance of cured core composition samples was tested after baking the dipped samples at 325° F. for 3, 6, and 9 minutes.

TABLE VIII

Test Core Composition 8

| | G. |
|---|---|
| Reclaimed core sand | 1200 |
| Lake sand | 800 |
| Cereal | 0 |
| Clay | 0 |
| Ferric oxide | 5 |
| Powdered wood rosin | 10 |
| Binder Q | 40 |
| Catalyst solution | 34 |

| | P.s.i. |
|---|---|
| Green compressive strength | 0.48 |
| Baked tensile strength | 201 |
| Water resistance: | |
| 3 min. | 148 |
| 6 min. | 75 |
| 9 min. | 111 |

One of the purposes of this example is to show that powdered wood rosin is used in place of powdered phenolic novolac to give a core composition of this invention.

Example 6

Using the procedure of Example 2, test core compositions 9, 10, 11 and 12 were prepared. Test Core Compositions 9 and 10 were prepared in a Clearfield muller and Test Core Compositions 11 and 12 were prepared in a Hobart mixer. The compositions of the test core compositions is given in Table IX. The green compressive strength, baked tensile strength, and water resistance of the tests is also given in Table IX. The tensile strength of Test Core Compositions 9 and 10 was tested after baking samples for 20 minutes at 450° F. The tensile strength of Core Composition 11 was tested after baking samples for 15 minutes at 325° F. and the tensile strength of Core Composition 12 was tested after baking the samples for 20 minutes at 325° F. The water resistance of all the core compositions was tested after baking dipped samples at 325° F. for 3, 6 and 9 minutes.

TABLE IX

|  | Test core composition | | | |
| --- | --- | --- | --- | --- |
|  | 9 | 10 | 11 | 12 |
| Reclaimed core sand, grams | 1,600 | 1,600 | 1,200 | 12,00 |
| Lake sand, grams | 400 | 400 | 800 | 800 |
| Cereal, grams | 10 | 10 | 10 | 10 |
| Bentonite, grams | 4 | 4 | 10 | 10 |
| Ferric oxide, grams | 3 | 3 | 5 | 5 |
| Powdered phenolic novolac, grams | 6.5 | 6.5 | 5 | 5 |
| $NH_4Cl$, grams | 0 | 0 | 0.8 | 0 |
| $NH_4NO_3$, grams | 0 | 1.2 | 0 | 0 |
| 70% PTSA in water, grams | 0 | 0 | 0 | 1.2 |
| Urea, grams | 7.4 | 7.4 | 7.4 | 0 |
| Water, grams | 22.6 | 22.6 | 25 | 0 |
| Binder Q (2,500 cps.), grams | 40 | 40 | 40 | 40 |
| "Zip-Slip", grams | 2 | 2 | 0 | 0 |
| Kerosine, grams | 2 | 2 | 1.5 | 1.5 |
| Green compressive strength (p.s.i.) | 0.65 | 0.66 | 0.50 | 0.50 |
| Baked tensile strength (p.s.i.) | 295 | 286 | 211 | 245 |
| Water resistance (p.s.i.): |  |  |  |  |
| 3 minutes | 135 | 155 | 153 |  |
| 6 minutes | 74 | 93 | 71 |  |
| 9 minutes | 139 | 144 | 125 |  |

In the above table PTSA refers to p-toluene sulfonic acid.

Among other purposes, one purpose of Test Core Compositions 9 and 10 is to show that an acid catalyst is not necessary for a satisfactory cure of the core compositions of this invention.

One of the purposes of Test Core Composition 11 is to show that $NH_4Cl$ can be used as a catalyst, as well as $NH_4NO_3$ in Test Core Composition 10.

It is one purpose of Test Core Composition 12 to show that PTSA may be satisfactorily used as a catalyst.

Example 7

Following the procedure of Example 2, Tests 13, 14, and 15 were made using a Hobart mixer. The compositions of the three test cores are given in Table X. The green compressive strength, baked tensile strength, and water resistance are also given in Table X. The tensile strength of the core compositions was tested after baking samples at 325° F. for 9 minutes. The water resistance was determined after dipping samples in water and baking them at 325° F. for 3, 6, 9 and 15 minutes.

TABLE X

|  | Test core composition | | |
| --- | --- | --- | --- |
|  | 13 | 14 | 15 |
| Reclaimed core sand, grams | 1,200 | 1,200 | 1,200 |
| Lake sand, grams | 800 | 800 | 800 |
| Cereal, grams | 10 | 10 | 10 |
| Bentonite, grams | 10 | 10 | 10 |
| Powdered phenolic novolac, grams | 0 | 5 | 5 |
| Pitch, grams | 10 | 10 | 0 |
| Ferric oxide, grams | 5 | 5 | 5 |
| Water, grams | 25 | 25 | 25 |
| $NH_4Cl$, grams | 0.8 | 0.8 | 0.8 |
| Urea, grams | 7.4 | 7.4 | 7.4 |
| Binder Q (500 cps.), grams | 40 | 40 | 40 |
| Kerosine, grams | 1.5 | 1.5 | 1.5 |
| Green compressive strength (p.s.i.) | 0.41 | 0.42 | 0.35 |
| Baked tensile strength (p.s.i.) | 107 | 115 | 200 |
| Water resistance (p.s.i.): |  |  |  |
| 3 minutes | 0 | 88 | 123 |
| 6 minutes | 0 | 67 | 97 |
| 9 minutes | 17 | 62 | 85 |
| 15 minutes | 53 | 67 | 107 |

Among the purposes of this example is to show that pitch cannot be substituted for powdered phenolic novolac to give water resistance to a cured core composition.

Example 8

By the procedure of Example 2, Test Core Compositions 16, 17 and 18 were prepared. The test core compositions were prepared in a Hobart mixer. The compositions of Test Core Compositions 16, 17 and 18 are given in Table XI. The green compressive and baked tensile strengths are also given in Table XI. The tensile strength of the core composition was tested after baking samples for up to 30 minutes at 325° F.

TABLE XI

|  | Test core composition | | |
| --- | --- | --- | --- |
|  | 16 | 17 | 18 |
| Reclaimed core sand, grams | 3,000 | 3,000 | 3,000 |
| Cereal, grams | 30 | 30 | 30 |
| Binder Q, grams | 45 | 0 | 0 |
| Binder U-25, grams | 0 | 45 | 0 |
| Binder U-18, grams | 0 | 0 | 45 |
| Catalyst solution, grams | 36.15 | 36.15 | 30.0 |
| Green compressive strength (p.s.i.) | .30 | .30 |  |
| Baked tensile strength (p.s.i.): |  |  |  |
| 8 minutes |  |  | 24 |
| 12 minutes |  |  | 34 |
| 15 minutes |  | 182 |  |
| 16 minutes |  |  | 48 |
| 17.5 minutes | 237 | 153 |  |
| 20 minutes | 229 | 128 | 58 |
| 30 minutes | 227 |  |  |

In the above table, Binder U-25 and Binder U-18 are furfuryl alcohol-urea - formaldehyde-calcium lignosulfonate binders. Binder U-25 consisted of 50 percent by weight "U.F. Concentrate-85," 25 percent by weight of 50 percent by weight calcium lignosulfonate in water, and 25 percent by weight furfuryl alcohol. Binder U-18 consisted of 52 percent by weight "U.F. Concentrate-85," 30 percent by weight of 50 percent by weight calcium lignosulfonate in water, and 18 percent by weight furfuryl alcohol. The catalyst solution consisted of 25 grams water, 7.4 grams urea, and 0.8 gram of ammonium nitrate.

It is one of the purposes of this example to show that furfuryl alcohol-"U.F. Concentrate-85" binder can comprise no more than 25 percent by weight calcium lignosulfonate.

Example 9

Following the procedure of Example 2, Tests 19, 20, 21, 22, 23 and 24 were prepared. The test core compositions were prepared in a Hobart mixer. The compositions of the Test Core Compositions 19, 20, 21, 22, 23 and 24 are given in Table XII. The green compressive strength are also given in Table XII. The tensile strength of Test Core Compositions 21 and 22 was tested after baking samples for 20 minutes at 450° F. The tensile strength of Test Core Compositions 19, 20, 23 and 24 was tested after baking samples for 20 minutes at 325° F.

TABLE XII

|  | Test core composition | | | | | |
| --- | --- | --- | --- | --- | --- | --- |
|  | 19 | 20 | 21 | 22 | 23 | 24 |
| Reclaimed core sand, grams | 1,200 | 1,200 | 1,200 | 1,200 | 1,200 | 1,200 |
| Lake sand, grams | 800 | 800 | 800 | 800 | 800 | 800 |
| Cereal, grams | 0 | 20 | 5 | 20 | 5 | 0 |
| Bentonite, grams | 0 | 0 | 5 | 20 | 15 | 20 |
| Ferric oxide, grams | 5 | 5 | 0 | 0 | 5 | 5 |
| Powdered phenolic novolac, grams | 6.5 | 5 | 6.5 | 6.5 | 5 | 5 |
| Catalyst solution, grams | 34 | 34 | 20 | 20 | 34 | 34 |
| Water, grams | 0 | 0 | 0 | 20 | 0 | 0 |
| Binder Q, grams | 40 | 40 | 40 | 40 | 40 | 40 |
| "Zip-Slip", grams | 2 | 0 | 2 | 2 | 0 | 0 |
| Kerosine, grams | 2 | 0 | 2 | 2 | 0 | 2 |
| Green compressive strength (p.s.i.) | 0.48 | 0.50 | 1.0 | 2.35 | 0.61 | 0.57 |
| Baked tensile strength (p.s.i.) |  | 226 | 176 | 194 | 219 | 91 |

This example demonstrates among other things that green compressive strength is a function of the combined amount of cereal and clay. Still another feature of this example is that it demonstrates that one percent of a combination of cereal and clay in addition to Binder Q provides a core having a baked tensile strength of about 200 p.s.i.

Example 10

Test Core Compositions 25 and 26 were prepared by the method of Example 2. The composition of the test cores and the water resistance of the cured cores is given in Table XIII. Samples of the cores were cured at 450° F. for 15 minutes. The water resistance of cured core samples was tested after baking the dipped samples at 325° F. for 3, 6 and 9 minutes.

The catalyst solution consisted of 7.4 grams urea in 12.6 grams water.

TABLE XIII

| | Test core compositions | |
|---|---|---|
| | 25 | 26 |
| Reclaimed sand, grams | 1,600 | 1,600 |
| Lake sand, grams | 400 | 400 |
| Cereal, grams | 10 | 10 |
| Bentonite, grams | 4 | 4 |
| Ferric oxide, grams | 0 | 0 |
| Powdered phenolic novolac, grams | 1 | 2 |
| Catalyst solution, grams | 20 | 20 |
| Binder Q (2,500 cps.), grams | 40 | 40 |
| "Zip-Slip", grams | 2 | 2 |
| Kerosine, grams | 2 | 2 |
| Water resistance (p.s.i.): | | |
| 3 minutes | 81 | 191 |
| 6 minutes | 72 | 143 |
| 9 minutes | 94 | 154 |

It is one purpose of this example to show that 0.1 percent by weight of the powered phenolic novolac based on the weight of the sand is necessary to produce a core composition which has a satisfactory water resistance on cure.

Example 11

Following the procedure of Example 2, Test Core Compositions 27 and 28 are prepared. The composition, green strength, baked tensile strength, and water resistance on cure are given in Table XIV. Samples of the cores were baked at 325° F. for 20 minutes and then tested for tensile strength.

The catalyst solution consisted of 7.4 grams urea and 0.8 grams of ammonium nitrate in 25 grams of water.

TABLE XIV

| | Test core composition | |
|---|---|---|
| | 27 | 28 |
| Reclaimed sand, grams | 1,200 | 1,200 |
| Lake sand, grams | 800 | 800 |
| Cereal, grams | 15 | 15 |
| Bentonite, grams | 5 | 5 |
| Ferric oxide, grams | 5 | 5 |
| Powdered phenolic novolac, grams | 5 | 0 |
| Liquid phenolic novolac, grams | 0 | 5 |
| Binder Q, grams | 40 | 40 |
| Catalyst solution, grams | 34 | 34 |
| Kerosine, grams | 1.5 | 1.5 |
| Green compressive strength (p.s.i.) | 0.50 | 0.40 |
| Baked tensile strength (p.s.i.) | 229 | 181 |
| Water resistance (p.s.i.): | | |
| 3 minutes | 158 | 90 |
| 6 minutes | 90 | 60 |
| 9 minutes | 153 | 144 |

One of the purposes of this example is to demonstrate that liquid phenolic novolac cannot be substituted for powdered phenolic novolac in the core compositions of this invention.

Example 12

Following the procedure of Example 2, Test Core Compositions 29, 30 and 31 were prepared. The composition, green compressive strength, baked tensile strength, and water resistance are given in Table XV. The test core compositions were prepared in a Hobart mixer. Samples of the cores were baked at 450° F. for 15 minutes and then tested for tensile strength.

TABLE XV

| | Test core composition | | |
|---|---|---|---|
| | 29 | 30 | 31 |
| Reclaimed sand, grams | 1,200 | 1,200 | 1,200 |
| Lake sand, grams | 800 | 800 | 800 |
| Cereal, grams | 15 | 15 | 15 |
| Bentonite, grams | 5 | 5 | 5 |
| Powdered phenolic novolac, grams | 6.5 | 6.5 | 6.5 |
| $NH_4NO_3$, grams | 0.2 | 0.2 | 0.2 |
| Urea, grams | 7.4 | 7.4 | 7.4 |
| $H_2O$, grams | 22.4 | 22.4 | 22.4 |
| Binder comprising (grams): | | | |
| "U.F. concentrate-85" | 21.0 | 21.0 | 21.0 |
| Furfuryl alcohol | 11.4 | 11.4 | 11.4 |
| 50% calcium lignosulfonate in $H_2O$ | 7.6 | 0 | 0 |
| 50% ammonium lignosulfonate in $H_2O$ | 0 | 7.6 | 0 |
| 50% sodium lignosulfonate in $H_2O$ | 0 | 0 | 7.6 |
| Green compressive strength (p.s.i.) | 0.40 | 0.35 | 0.34 |
| Baked tensile strength (p.s.i.) | 278 | 235 | 238 |
| Water resistance (p.s.i.): | | | |
| 3 minutes | 154 | 160 | 123 |
| 6 minutes | 165 | 146 | 96 |
| 9 minutes | 158 | 150 | 153 |

It is one purpose of this example to show that the following lignosulfonates among other are effective in the core compositions of this invention comprising a binder composed of furfuryl alcohol-urea-formaldehyde-lignosulfonate: calcium lignosulfonate, ammonium lignosulfonate, and sodium lignosulfonate.

Example 13

Using the procedure of Example 2, Test Core Compositions 32 and 33 were prepared. The composition green compressive strength, and water resistance are given in Table XVI. The test core compositions were prepared in a Clearfield muller, Ser. No. 598C. Samples of the test core compositions were baked at 450° F. for 15 minutes and then tested for tensile strength.

TABLE XVI

| | Test core composition | |
|---|---|---|
| | 32 | 33 |
| Reclaimed sand, grams | 1,200 | 1,200 |
| Lake sand, grams | 800 | 800 |
| Cereal, grams | 15 | 15 |
| Bentonite, grams | 5 | 5 |
| Powdered phenolic novolac, grams | 0 | 6.5 |
| $NH_4NO_3$, grams | 0.2 | 0.2 |
| Urea, grams | 7.4 | 7.4 |
| $H_2O$, grams | 22.4 | 22.4 |
| Phenol-urea-formaldehyde resin, grams | 40 | 40 |
| "Zip-Slip," grams | 2 | 2 |
| Kerosine, grams | 2 | 2 |
| Green compressive strength (p.s.i.) | 0.50 | 0.54 |
| Baked tensile strength (p.s.i.) | 205 | 321 |
| Water resistance (p.s.i.): | | |
| 3 minutes | 173 | 303 |
| 6 minutes | 144 | 224 |
| 9 minutes | 148 | 250 |

One purpose of this example is to demonstrate that powdered phenolic novolac is beneficial in the core compositions of this invention wherein the themosetting resin is a phenol-urea-formaldehyde resin. The phenolic novolac increases the green compressive strength, baked tensile strength, and water resistance.

Example 14

Test Core Compositions 34 and 35 were prepared according to the procedure of Example 2. The composition, green compressive strength, baked tensile strength, and water resistance are given in Table XVII. The test core compositions were prepared in a Clearfield muller, Ser. No. 598C. Samples of the test core compositions were baked at 450° F. for 15 minutes and then tested for tensile strength.

TABLE XVII

| | Test core compositions | |
|---|---|---|
| | 34 | 35 |
| Reclaimed sand, grams | 1,600 | 1,600 |
| Lake sand, grams | 400 | 400 |
| Cereal, grams | 15 | 15 |
| Clay, grams | 5 | 5 |
| Powdered phenolic novolac, grams | 6.5 | 0 |
| $NH_4NO_3$, grams | 0.2 | 0.2 |
| Urea, grams | 7.4 | 7.4 |
| $H_2O$, grams | 22.4 | 22.4 |
| Binder comprising (grams): | | |
| "U.F. Concentrate-85" | 21.0 | 21.0 |
| Furfuryl alcohol | 11.4 | 11.4 |
| Phenolic resole | 7.6 | 7.6 |
| "Zip-Slip", grams | 2 | 2 |
| Kerosine, grams | 2 | 2 |
| Green compressive strength (p.s.i.) | 0.45 | 0.40 |
| Baked tensile strength (p.s.i.) | 213 | 143 |
| Water resistance (p.s.i.): | | |
| 3 minutes | 141 | 116 |
| 6 minutes | 135 | 68 |
| 9 minutes | 139 | 101 |

It is one purpose of this example to show that powdered phenolic novolac is beneficial in the core compositions of this invention wherein the thermosetting resin is a phenol modified furfuryl alcohol-urea-formaldehyde resin. The phenolic novolac increases the green compressive strength, baked tensile strength, and water resistance of the core composition.

From the foregoing description we consider it to be clear that the present invention contributes a substantial benefit to the art by providing a new and useful core binder.

We claim:

1. A fast baking core composition which comprises sand; at least 0.5 percent by weight based on the weight of the sand of a thermosetting resin member selected from the group consisting of furan resins, phenolic resoles, and furan-phenolic resins; from 0.5 to 2 percent by weight based on the weight of the sand of a gelling member selected from the group consisting of cereal, clay, and mixtures thereof; from 0.5 to 2.0 percent by weight based on the weight of the sand of water; and from 0.1 to 1.0 percent by weight based on the weight of the sand of a solid hydrophobic member selected from the group consisting of powdered phenolic novolac and rosin.

2. The fast baking core composition of claim 1 wherein said thermosetting resin is furfuryl alcohol-urea-formaldehyde-lignosulfonate binder, said binder comprising 25 to 50 parts by weight of a combination of furfuryl alcohol and a lignosulfonate selected from the group consisting of calcium lignosulfonate, sodium lignosulfonate, ammonium lignosulfonate, aluminum lignosulfonate, and magnesium lignosulfonate; wherein said combination comprises no more than 25 percent by weight of said lignosulfonate; and about 70 to 35 parts by weight of a stable non-polymerized aqueous mixture of urea, formaldehyde, and equilibrium products thereof; said urea present in an amount sufficient to give a molar ratio of available urea to available formaldehyde in the range of about 1.5:1 to 5:1 in said core composition.

3. A fast baking core composition which comprises sand; at least 0.5 percent by weight based on the weight of the sand of a thermosetting resin member selected from the group consisting of furan resins, phenolic resoles, and furan-phenolic resins; from 0.5 to 2 percent by weight based on the weight of the sand of a gelling member selected from the group consisting of cereal, clay, and mixtures thereof; from 0.5 to 2.0 percent by weight based on the weight of the sand of water; and from 0.1 to 1.0 percent by weight based on the weight of the sand of a powdered phenolic novolac.

4. The fast baking core composition of claim 3 wherein said thermosetting resin is furfuryl alcohol-urea-formaldehyde-lignosulfonate binder, said binder comprising 25 to 50 parts by weight of a combination of furfuryl alcohol and a lignosulfonate selected from the group consisting of calcium lignosulfonate, sodium lignosulfonate, ammonium lignosulfonate, aluminum lignosulfonate, and magnesium lignosulfonate; wherein said combination comprises no more than 25 percent by weight of said lignosulfonate; and about 70 to 35 parts by weight of a stable non-polymerized aqueous mixture of urea, formaldehyde, and equilibrium products thereof; said urea present in an amount sufficient to give a molar ratio of available urea to available formaldehyde in the range of about 1.5:1 to 5:1 in said core composition.

References Cited

UNITED STATES PATENTS 3,551,365    12/1970    Matalon _____ 260—17.2

WILLIAM H. SHORT, Primary Examiner

E. WOODBERRY, Assistant Examiner

U.S. Cl. X.R.

260—17.3, 17.5, 25, 27, 29.3, 29.4, 38, 39, DIG. 40